(12) United States Patent
Cannon et al.

(10) Patent No.: US 6,952,471 B1
(45) Date of Patent: Oct. 4, 2005

(54) HANDSET PROXIMITY MUTING

(75) Inventors: Joseph M. Cannon, Harleysville, PA (US); James A. Johanson, Macungie, PA (US); Philip D. Mooney, Sellersville, PA (US)

(73) Assignee: Agere Systems Inc., Allentown, PA (US)

( * ) Notice: Subject to any disclaimer, the term of this patent is extended or adjusted under 35 U.S.C. 154(b) by 938 days.

(21) Appl. No.: 09/590,684

(22) Filed: Jun. 9, 2000

(51) Int. Cl.$^7$ ............................................. H04M 1/72
(52) U.S. Cl. .............................. 379/390.01; 379/338.01
(58) Field of Search ....................... 379/388.01, 388.03, 379/388.07, 388.02, 388.05, 390.03; 455/404.2

(56) References Cited

U.S. PATENT DOCUMENTS

| | | | |
|---|---|---|---|
| 3,952,166 A | * 4/1976 | Kato et al. | 379/390.02 |
| 5,572,575 A | * 11/1996 | Yamamoto et al. | 455/412.1 |
| 6,477,363 B1 | * 11/2002 | Ayoub et al. | 455/404.2 |
| 6,560,462 B1 | * 5/2003 | Ravi et al. | 455/456.1 |

* cited by examiner

*Primary Examiner*—Xu Mei
*Assistant Examiner*—Walter F. Briney, III

(57) ABSTRACT

Apparatus and methods for automatically (i.e., without requiring manual user adjustment) reducing gain in one or both acoustic feedback paths of a cordless telephone when the handset and its base unit are operating in close proximity to one another, preventing uncontrolled feedback and audible howling even before it begins. A proximity detection module determines a distance between the handset and its base unit using an appropriate technique, e.g., using RSSI, round trip delay times, and/or GPS measurements. If the distance indicates that the handset is within close proximity to the base unit, appropriate attenuation of the microphone gain and/or speaker volume of the base unit and/or the handset will be implemented. One or more fixed levels of attenuation may be implemented based on a corresponding one or more measured close proximity distances between the handset and its base unit. Thus, the attenuation may result in a muting, a fixed amount of attenuation (e.g., 6 decibels (dB), 12 dB, or other appropriate fixed amount), or may be a variable amount dependent upon a relationship to the distance between the handset and the base unit.

24 Claims, 7 Drawing Sheets

HANDSET PROXIMITY MUTING

BACKGROUND OF THE INVENTION

1. Field of the Invention

This invention relates generally to cordless telephones. More particularly, it relates to cordless telephones having improved audio feedback control, especially when the cordless telephone is operating in a speakerphone mode.

2. Background of Related Art

Many cordless telephones come with a speakerphone built into the base. The user typically has the ability to carry on a conversation using the handset alone, or using the base unit alone as a speakerphone. Many cordless telephones permit both the handset and the base unit to be operated simultaneously, allowing one person to participate in a telephone call using the handset while another person participates using the base unit.

The physical environment of the cordless telephone may cause direct or indirect audible echoes in the audio signals between the handset and the base unit. For instance, a primary source of acoustical feedback is caused from sounds output by the speaker of the base unit operating in a speakerphone mode being picked back up by a microphone in the handset. This most frequently occurs when the output sound bounces off the ceiling, walls and other structures in the room. A secondary source of acoustic feedback results from sounds output from the handset and picked up by the base unit.

As many users of such a cordless telephone know, acoustical feedback typically causes uncomfortable feedback such as squealing in the signal output from the speaker. Thus, care must be taken when using both the handset and the base unit simultaneously to maintain a safe distance between the simultaneously operating handset and base unit to avoid acoustic feedback.

However, even with the risk of acoustic feedback causing a howl, there may be times when it is desired to have both the handset and the base unit operating in close proximity. For instance, if the user of the handset is moving about a room, and passes by the base unit simultaneously operating as a speakerphone.

FIG. 7 shows a conventional base unit 700 and handset 702 of a cordless telephone during an acoustical feedback scenario.

In particular, as shown in FIG. 7, both the handset 702 and the base unit 700 are operating simultaneously in close proximity to one another. This causes primary acoustical feedback from sound output by the speaker 760 of the base unit being picked up by the microphone 752 of the handset 702, and even in some cases secondary feedback from sound output by the speaker 750 of the handset being picked up by the microphone 762 of the base unit 700. These are relatively low loss feedback paths which may become unstable, cause howling from the speaker of the base unit and/or from the speaker of the remote handset.

Some cordless telephones include acoustic echo cancellers (AECs). Conventional acoustical echo cancellers suppress audio picked up by a microphone which was output by a speaker on the same telephone. These conventional AECs are typically adaptive, speech trained and monitored and adjusted as necessary for optimal performance.

AECs typically perform well with acoustic reflections off a wall or ceiling, but operate less effectively and even not at all when trying to overcome the acoustic feedback problems associated with the howl caused when an operating handset comes within close proximity of its base unit while in speakerphone mode.

The same problems are associated with a handset of a cordless telephone which is capable of operating in a speakerphone mode.

There is a need for apparatus and methods for reducing or eliminating the risk or danger of acoustical feedback in cordless telephones.

SUMMARY OF THE INVENTION

In accordance with the principles of the present invention, an audio path attenuation controller for a cordless telephone comprises a proximity determinator to determine a distance between a handset of the cordless telephone and a base unit of the cordless telephone, and to effectuate a given attenuation of an audio path based on the determined distance.

A method of attenuating an audio path of a cordless telephone in accordance with another aspect of the present invention comprises determining a proximity of a handset of the cordless telephone to a base unit of the cordless telephone, and attenuating at least one audio path between the handset and the base unit when the handset is within a predetermined close distance to the base unit. The attenuation prevents instability in audible feedback between the handset and the base unit.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention relates to apparatus and methods for automatically (i.e., without requiring manual user adjustment) reducing gain in one or both acoustic feedback paths of a cordless telephone when the handset and its base unit are operating in close proximity to one another.

Operation of the base unit generally refers to operation of the base unit in a speakerphone or intercom mode. In either of these modes, when the handset is also in operation, an audio link is established by the cordless telephone between the user of the remote handset and the user of the base unit. As discussed, this audio link can be the source of very uncomfortable audible howling if the user of the remote handset moves too close to the base unit while the base unit is also in operation.

In accordance with the principles of the present invention, if both the remote handset and the base unit of a particular cordless telephone are simultaneously in operation, then the proximity of the remote handset to the base unit is determined. If the remote handset is determined to be within close proximity of the base unit (e.g., less than 10 feet, less than 5 feet, or other appropriate threshold proximity distance), then the gain of the audio path in either direction between the remote handset and its base unit is attenuated.

The attenuation may be a muting, a fixed amount of attenuation (e.g., 6 decibels (dB), 12 dB, or other appropriate fixed amount), or may be a variable amount of attenuation dependent upon a relationship to the distance between the remote handset and the base unit.

For instance, if a variable relationship is implemented, a non-linear amount of attenuation with respect to the distance (e.g., one-over the square-root of the distance) may be preferred. This would ensure that the cordless telephone can remain functional even with the remote handset within close proximity of its base unit up to a certain point, with very close distances essentially causing a muting of one or both audio paths. Using a variable relationship, the closer the handset is to the base unit, the more attenuation would be added, preferably in stepwise increments (e.g., in steps of 3 dB).

Figure 1:
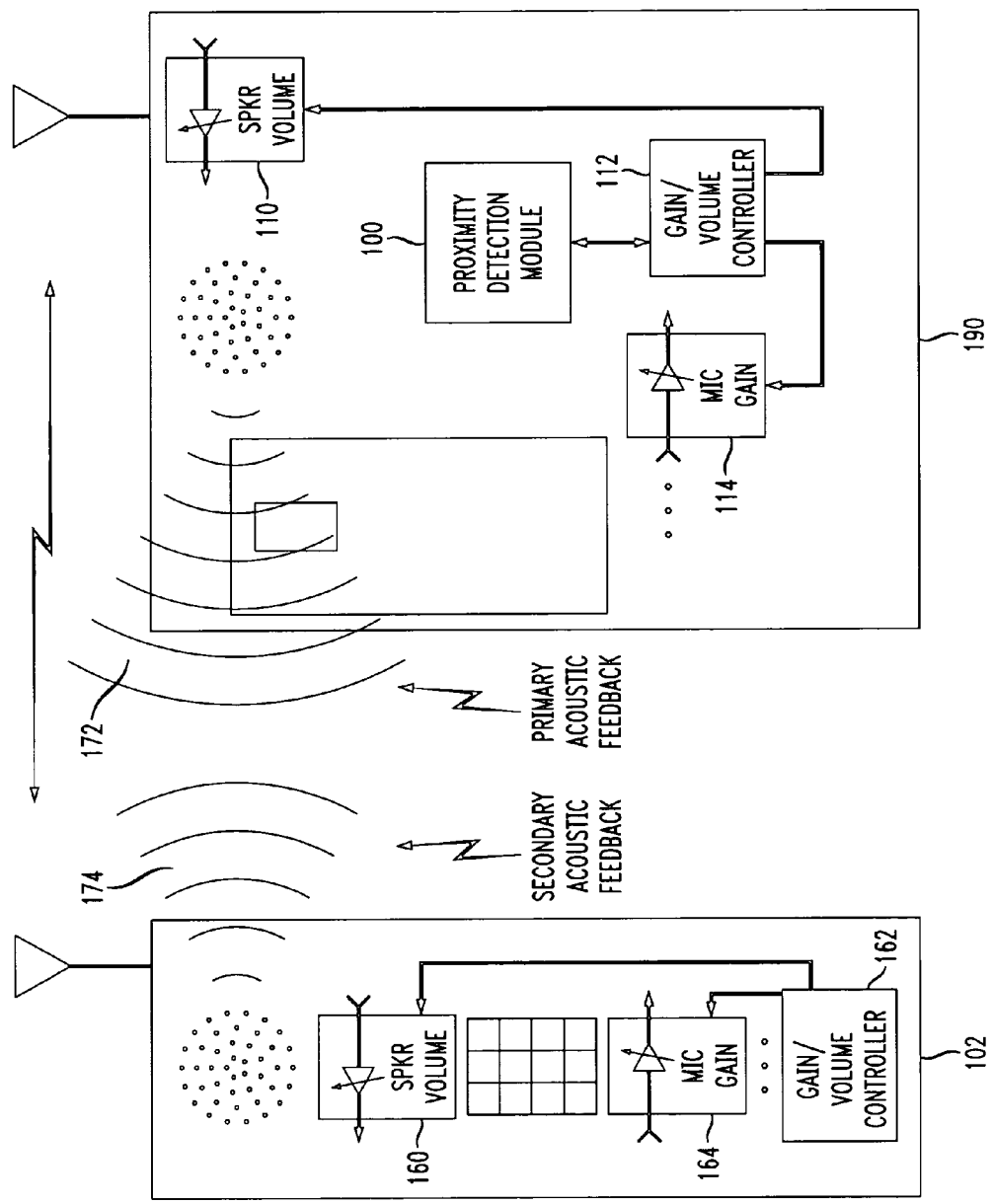
FIG. 1 shows a cordless telephone including a proximity detection module in a base unit, and gain/volume controllers in both the base unit and the handset, for muting or attenuating a microphone and/or speaker path when a simultaneously handset and base unit come within close proximity of one another, in accordance with the principles of the present invention.

FIG. 1 shows a cordless telephone including a proximity detection module 100 in a base unit 190, and gain/volume controllers 112, 162 in both the base unit 190 and the handset 102, respectively, for muting or attenuating an audio path (e.g., the gain a microphone and/or the volume of a speaker) when a simultaneously operating handset 102 and base unit 190 come within close proximity of one another, in accordance with the principles of the present invention.

In particular, as shown in FIG. 1, a cordless telephone includes a remote handset 102 and a matching base unit 190. The remote handset 102 includes a speaker including an electronically controlled speaker volume 160, and a microphone including an electronically controlled microphone gain module 164. The speaker volume 160 and microphone gain 164 are set by an appropriate control element such as a gain/volume controller 162. The gain/volume controller 162 may be any suitable processing element for the particular application, e.g., a microprocessor, a microcontroller, a digital signal processor (DSP) or ASIC.

Similarly, the base unit 190 includes a speaker including an electronically controlled speaker volume 110, and a microphone including an electronically controlled microphone gain module 114. The speaker volume 110 and microphone gain 114 are set by an appropriate control element such as a gain/volume controller 112.

Figure 2:
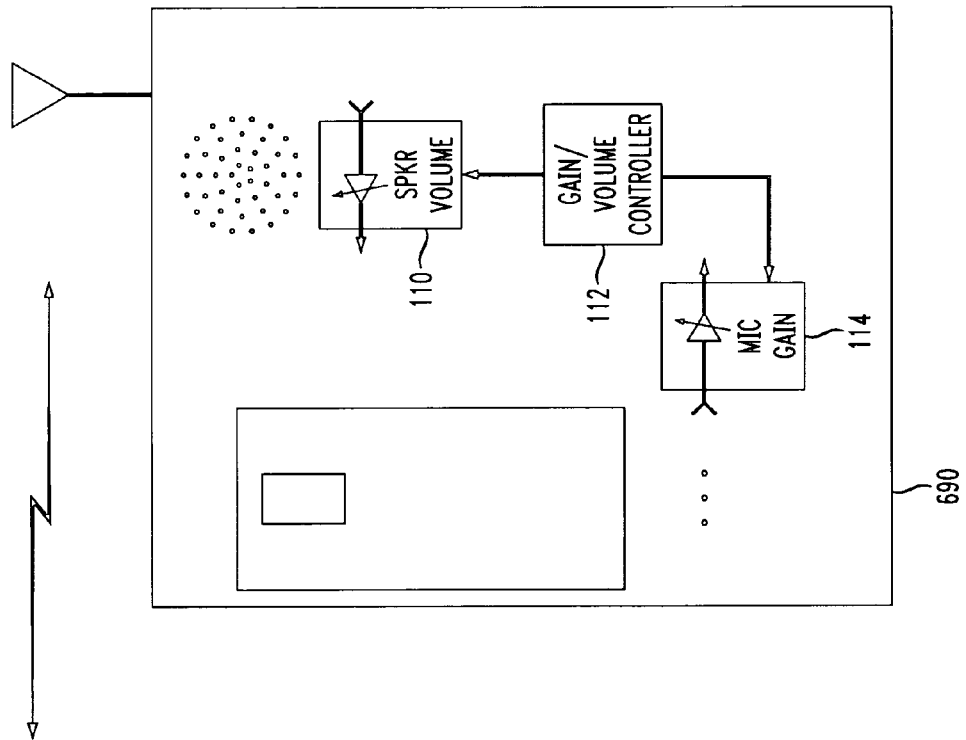
FIG. 2 shows a cordless telephone including a proximity detection module in a handset, and gain/volume controllers in both the base unit and the handset, for muting or attenuating a microphone and/or speaker path when a simultaneously handset and base unit come within close proximity of one another, in accordance with the principles of the present invention.
Figure 2:
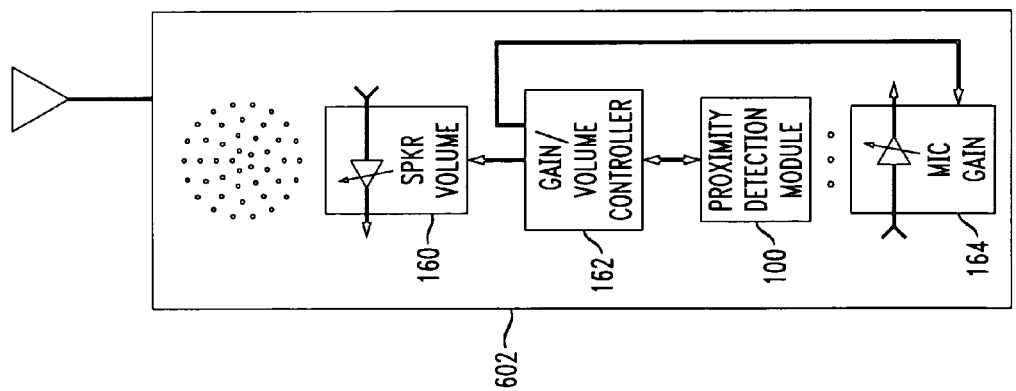

In accordance with the principles of the present invention, the cordless telephone includes a proximity detection module 100 either in the base unit 190 (as shown in FIG. 1), or in the remote handset 102 (as shown in FIG. 2). The proximity detection module 100 determines (1) if the handset 102 and its base unit 190 are simultaneously operating, (2) an approximate distance between the remote handset 102 and its base unit 190, and (3) an amount of attenuation to be applied to a particular audio path.

The proximity detection module 100 may be a software program running on an appropriate processor (e.g., microprocessor, microcontroller, or digital signal processor (DSP)), or an appropriate ASIC device.

Figure 3:
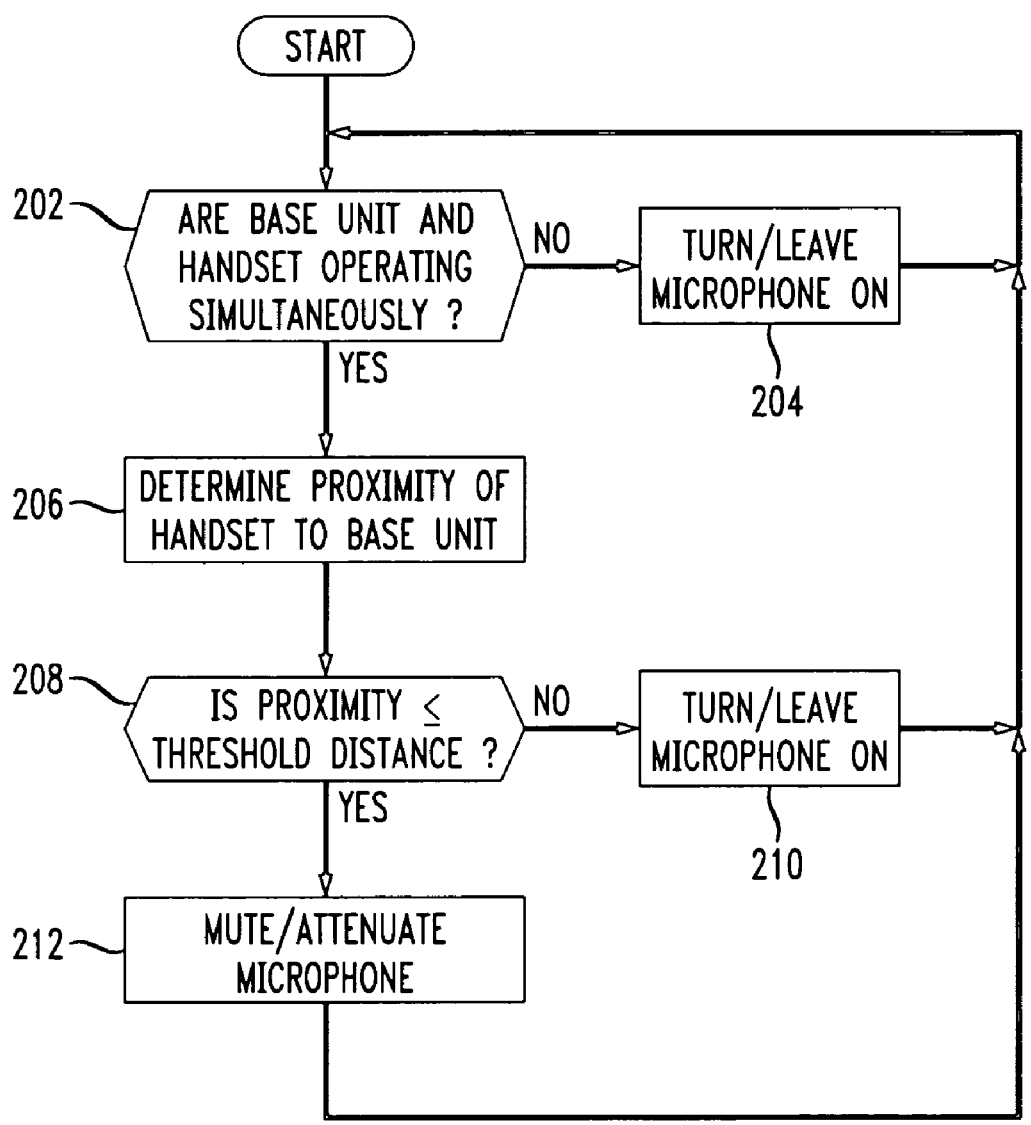
FIG. 3 shows an exemplary process for muting or attenuating a microphone path in a handset and/or in a base unit of a cordless telephone when the handset and the base unit are simultaneously operating within close proximity of one another, in accordance with the principles of the present invention.

FIG. 3 shows an exemplary process for muting or attenuating a microphone path in a handset 102 and/or in a base unit 190 of a cordless telephone when the handset 102 and the base unit 190 are simultaneously operating within close proximity of one another, in accordance with the principles of the present invention.

In particular, as shown in step 202 of FIG. 3, the proximity detection module 100 determines whether or not the base unit 190 and the remote handset 102 are operating simultaneously (i.e., either in handset, speakerphone, or intercom mode).

If not, in step 204, the proximity detection module 100 leaves the microphone audio path (and/or speaker volume) unattenuated beyond that otherwise set by the user (e.g., using a manual volume control).

If the remote handset 102 and base unit 190 are both operating, the proximity detection module 100 determines a proximity (i.e., distance) of the remote handset 102 to the base unit 190, as shown in step 206.

In step 208, the proximity detection module 100 determines if the proximity determined in step 206 is less than or equal to a particular proximity threshold distance.

The particular proximity threshold distance used may vary among various makes and models of cordless telephones, and is preferably established based on the particular application. The proximity threshold distance may be arbitrarily set (e.g., 5 feet, 10 feet), or determined empirically by the manufacturer. The proximity threshold distance is preferably stored in appropriate memory accessible by the proximity detection module 100, in accordance with the principles of the present invention.

If the handset 102 is not within the prescribed proximity threshold distance of the base unit 190, the controlled audio path(s) (e.g., the microphone gain) are left unattenuated, as shown in step 210.

However, as shown in step 212, if the handset 102 is within the prescribed proximity threshold distance of the base unit 190, an appropriate audio path (e.g., the microphone gain 114 or the speaker volume 110) will be appropriately attenuated (for instance, by a fixed amount of 6 dB or 12 dB).

Thus, in accordance with the principles of the present invention, when the remote handset 102 is determined to be in close proximity to its matching base unit 190, attenuation may be added to either the base speaker or the base microphone using the electronically controlled base speaker volume 110, or to the handset microphone using the electronically controlled handset microphone gain 164.

The proximity detection module 100, whether located in the base unit 190 as shown in FIG. 1, or in the remote handset 102 as shown in FIG. 2, preferably communicates information over the radio frequency (RF) link between the base unit 190 and the remote handset 102 regarding the particular amount of attenuation to add to the audio path from the opposite device.

For instance, as shown in FIG. 1, the proximity detection module 100 in the base unit 190 may add attenuation to the microphone gain of the remote handset 102 by passing appropriate information over the RF link to the gain/volume controller 162 of the remote handset 102. Similarly, if the proximity detection module 100 is located in the remote handset 102 as shown in FIG. 2, the remote handset 102 may add attenuation to the speaker volume of the base unit 190 by passing appropriate information over the RF link to the gain/volume controller 112 of the base unit 190.

While FIGS. 1 and 2 respectively show the proximity detection module 100 in either the base unit 190 or in the remote handset 102, the functions of the proximity detection module 100 may be spread between the two devices 102, 190. For instance, the proximity between the remote handset 102 and its base unit 190 may be individually determined by both the base unit 190 and the remote handset 102. Similarly, given the determination that the operating remote handset 102 is within close proximity of the operating base unit 190, the attenuation of microphone gains 164, 114 and/or speaker volumes 160, 110 may be separately determined and controlled by the respective device 102, 190.

In accordance with the principles of the present invention, once the remote handset 102 separates beyond the threshold proximity distance from the base unit 190, whatever attenuation that was added is then removed.

A preferred technique is to attenuate the primary acoustic feedback path 172 as shown in FIG. 1. In particular, the primary acoustic feedback path 172 can be attenuated by attenuating at the remote handset 102 microphone data picked up at the handset 102, before sending the microphone data over the RF link to the base unit 190, to be passed through the speaker volume 110, and ultimately to the speaker of the base unit 190. Moreover, to isolate the other party on the telephone line from the attenuation, the microphone data transmitted on the telephone line from the base unit 190 can be transmitted without the attenuation added at the remote handset 102. Thus, an appropriate amplification of the microphone data received by the base unit 190 before transmission on the telephone line may be implemented.

Reducing the gain of the microphone in the remote handset 102 does not significantly reduce the usability of the cordless telephone, particularly since at the point where the handset 102 and the base unit 190 would otherwise howl, the user of the handset 102 may be close enough to the base unit 190 that his or her voice would be picked up by the microphone of the base unit 190 operating in a speakerphone or intercom mode, and certainly by the user of the base unit 190.

The secondary acoustic feedback path 174 from the speaker of the remote handset 102 and the microphone of the base unit 190 may be handled in a similar manner. However, attenuation of the secondary acoustic feedback path 174 is generally of less importance than that of the primary acoustic feedback path 172. Thus, not as much attenuation would not likely be necessary in the secondary acoustic feedback path 174, but attenuation nevertheless can be added to the microphone of the base unit 190 after the microphone data is received from by the remote handset 102. A normal or otherwise user controlled level of microphone data may be transmitted over the telephone line.

Figure 4:
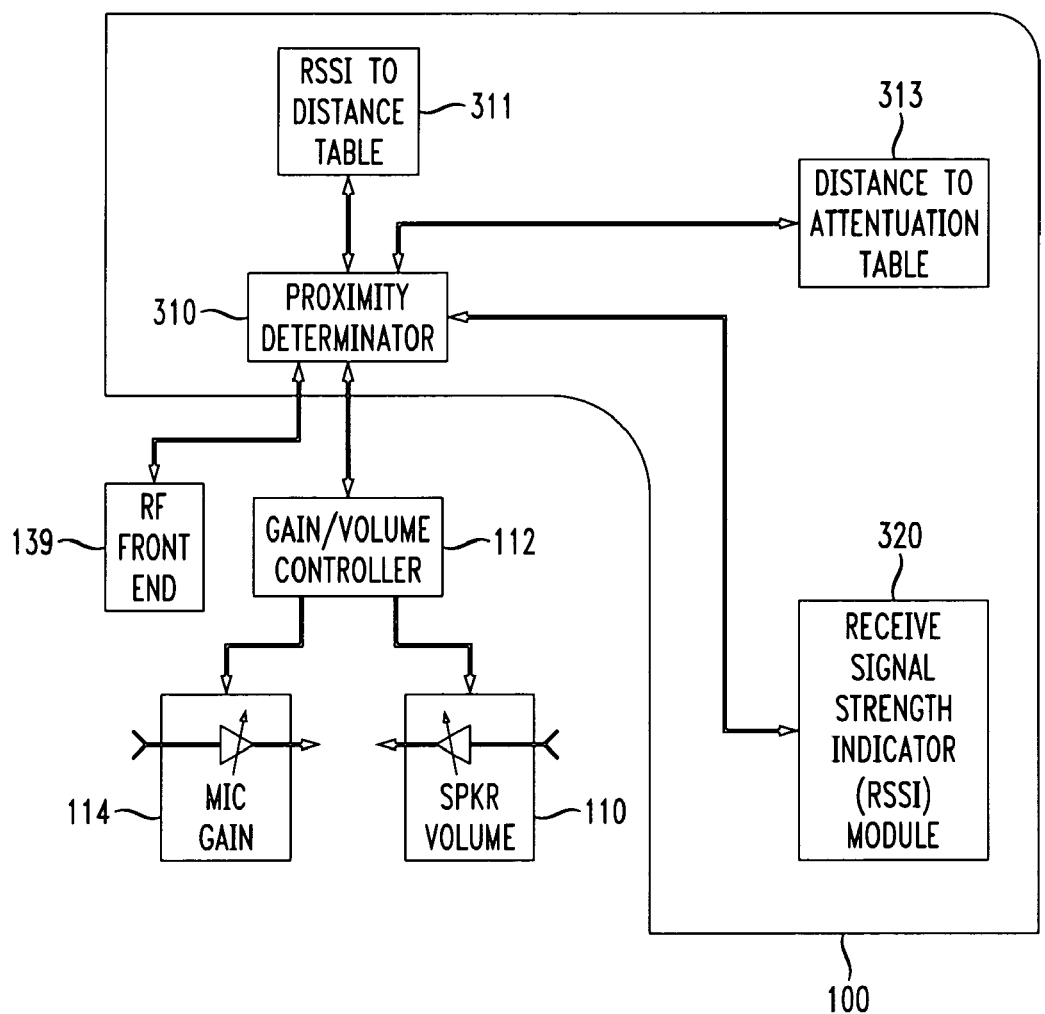
FIG. 4 shows in detail a first embodiment of the proximity detection module shown in FIGS. 1 and 2 implementing a receive signal strength indicator (RSSI) module as a basis for determining a proximity of a simultaneously operating handset and base unit of a cordless telephone, in accordance with the principles of the present invention.

FIG. 4 shows in detail a first embodiment of an exemplary proximity detection module shown in FIGS. 1 and 2 implementing a receive signal strength indicator (RSSI) module as a basis for determining a proximity of a simultaneously operating handset and base unit of a cordless telephone, in accordance with the principles of the present invention.

In particular, the proximity of the cordless handset 102 to the base unit 190 can be measured in a number of ways. One exemplary technique for measuring the distance between the remote handset 102 and the base unit 190 is to use a Received Signal Strength Indicator (RSSI). The higher the RSSI, the closer the handset 102 is presumed to be to the base unit 190.

As shown in FIG. 4, the exemplary proximity detection module 100 includes a proximity determinator 310, and an RSSI module 320.

The RSSI module 320 determines an amount of RSSI as is known in the art.

The proximity determinator 310 receives the RSSI from the RSSI module 320, and compares the RSSI level with an RSSI to distance table 311 or other appropriate information source.

More than one table, and/or a table adjustment factor, may be used to accommodate a current power level of the cordless telephone. For instance, a number of tables can be established each relating to a particular power level utilized by the handset of the cordless telephone.

The proximity determinator 310 associates the current RSSI level with an entry in the RSSI to distance table 311 associating a distance between the remote handset 102 and the base unit 190, and returns the distance between the remote handset 102 and the base unit 190.

Given the distance, the proximity determinator 310 determines a desired amount of attenuation to be applied in the audio paths at either the remote handset or at the base unit. The desired amount of attenuation may be fixed and retrieved from an appropriate memory, or variable based on the value of the distance.

A variable amount of attenuation may be determined by the proximity determinator 310, e.g., from a distance to attenuation table 313. The distance to attenuation table 313 may associate a distance between the remote handset 102 and the base unit 190 with a particular amount of attenuation for the microphone gain 114 and/or speaker volume 110 of the base unit 190, and/or with a particular amount of attenuation for the microphone gain 164 and/or speaker volume 160 in the remote handset 102.

Once the proximity determinator 310 determines the amount of attenuation (if any) desired for the respective audio paths, the attenuation levels are passed electronically and automatically by the proximity determinator 310 directly to the relevant gain/volume controller 112 for the microphone and speaker within the relevant device, and/or via the RF front end to the opposite device.

Figure 5:
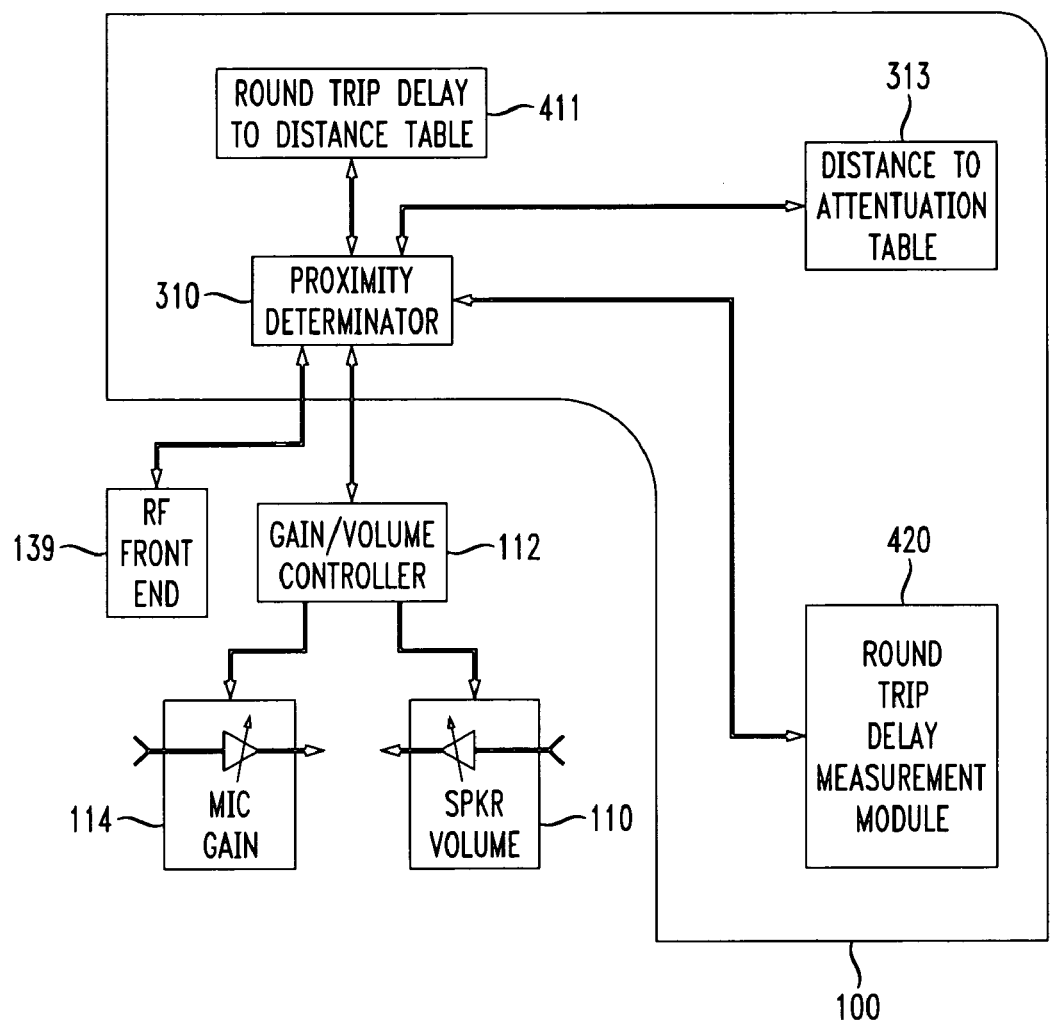
FIG. 5 shows in detail a second embodiment of the proximity detection module shown in FIGS. 1 and 2 implementing a round trip delay measurement module as a basis for determining the proximity of a simultaneously operating handset and base unit of a cordless telephone, in accordance with the principles of the present invention.

FIG. 5 shows in detail a second embodiment of an exemplary proximity detection module 100 shown in FIGS. 1 and 2 implementing a round trip delay measurement module 420 as a basis for determining the proximity of a simultaneously operating handset 102 and base unit 190 of a cordless telephone, in accordance with the principles of the present invention.

In particular, as shown in FIG. 5, the RSSI module 320 show in FIG. 4 is replaced with a round trip delay measurement module 420, and the RSSI to distance table 311 shown in FIG. 4 is replaced with a round trip delay to distance table 411. Otherwise, the operation and functions of the embodiment shown in FIG. 5 are substantially the same as those shown and described with respect to FIG. 4.

The round trip delay to distance table 411 associates a round trip delay time of a particular message passed both ways between the base unit 190 and the remote handset 102. Entries in the round trip delay to distance table 411 can be determined empirically from use of the particular make and model cordless telephone.

The round trip delay measurement module 420 generates a command for transmission via the RF front end 139 to the other device of the cordless telephone. A time stamp is associated with the generation and transmission of the timing message. A time of a response is measured. The response may be any appropriate signal, e.g., an acknowledgement signal. The difference between the time at which the response signal was received and the time stamp of the originally transmitted command is a round trip delay.

As this delay increases, the distance between the remote handset 102 and the base unit 190 is presumed to increase. Similarly, as this delay decreases, the proximity of the remote handset 102 to the base unit 190 is presumed to decrease. The threshold proximity distance or a plurality of variable distances) can be associated with a particular round trip delay, in accordance with the principles of the present invention.

The particular message which is passed between the remote handset 102 and the base unit 190 is not important, so long as the message is returned without variations in delays caused other than from the distance between the remote handset 102 and the base unit 190. Moreover, the message may be a message which is transmitted in the ordinary operation of the cordless telephone, e.g., a polling message between the remote handset 102 and the base unit 190.

Figure 6:
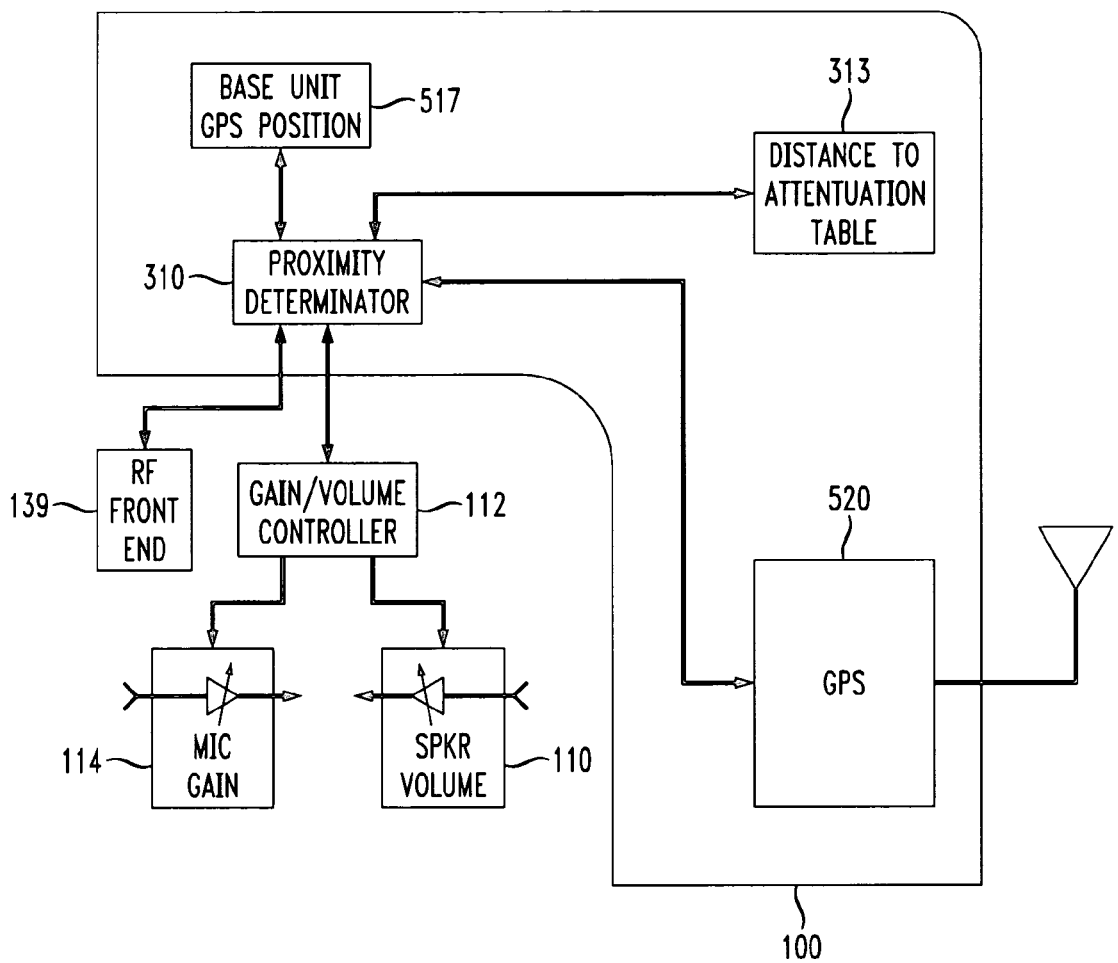
FIG. 6 shows in detail a third embodiment of the proximity detection module shown in FIGS. 1 and 2 implementing a global positioning satellite (GPS) system as a basis for determining the proximity of a simultaneously operating handset and base unit of a cordless telephone, in accordance with the principles of the present invention.
Figure 7:
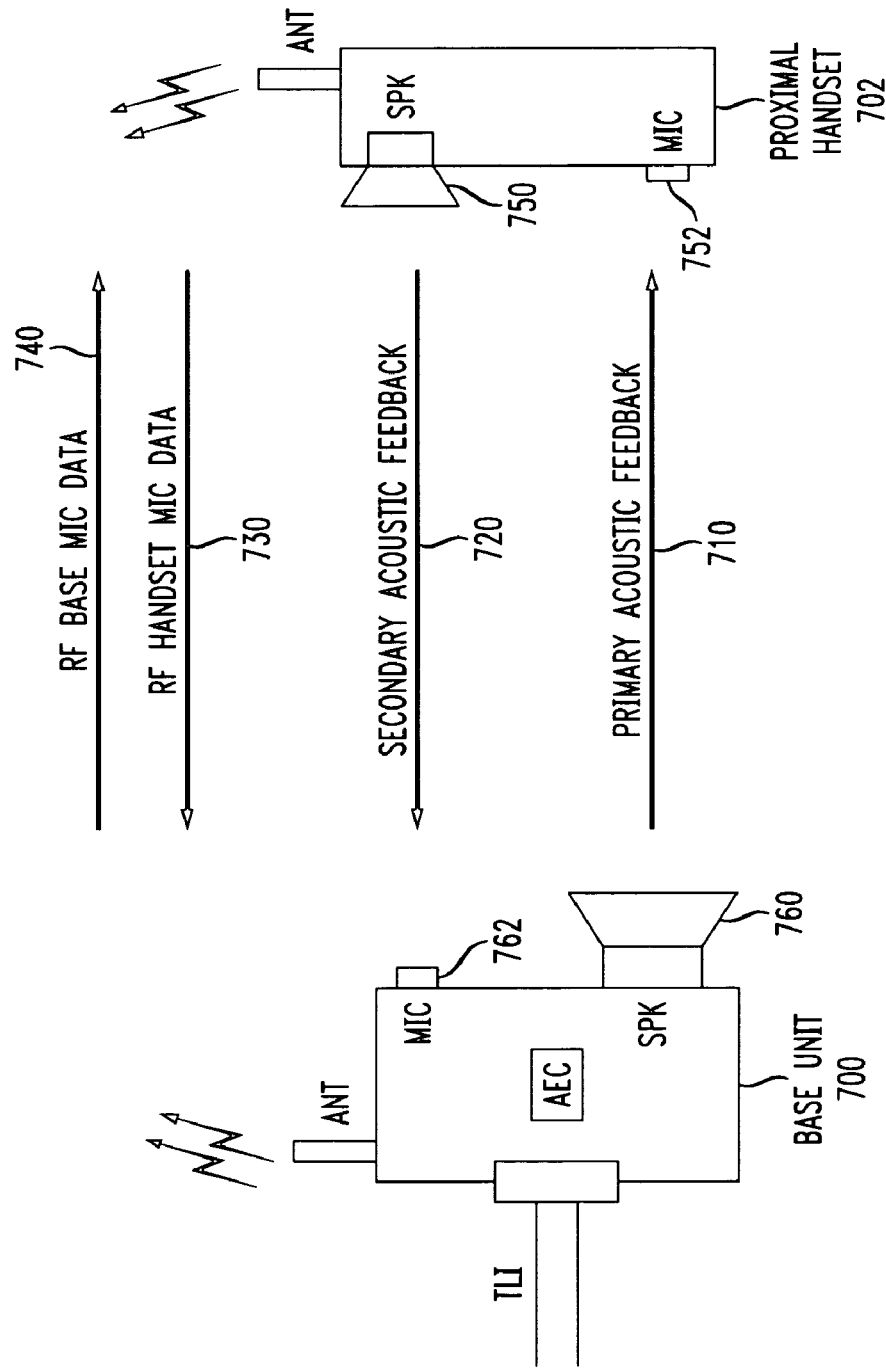
FIG. 7 shows a conventional base unit and handset of a cordless telephone during an acoustical feedback scenario.

FIG. 6 shows in detail a third embodiment of yet another exemplary proximity detection module shown in FIGS. 1 and 2 implementing a global positioning satellite (GPS) system as a basis for determining the proximity of a simultaneously operating handset and base unit of a cordless telephone, in accordance with the principles of the present invention.

In particular, as shown in FIG. 6, a precise distance between the base unit 190 and the remote handset 102 may be measured using a global positioning satellite (GPS) system 520 in the remote handset 102, although this technique may be more limited than the embodiments shown in FIGS. 4 and 5 because of the relatively coarse resolution of a typical GPS system. However, the resolution can be improved using techniques such as differential GPS, which is accurate, e.g., down to centimeters.

The latitude and longitude (and altitude) of the base unit 190 can be measured while the handset 102 is in a non-operational or otherwise on-hook condition, and stored in an appropriate memory accessible by the proximity determinator 310, e.g., in a base unit GPS position memory or register 517. When the handset 102 is hung up, the position of the remote handset 102 is presumed to be the position of the typically non-mobile base unit 190.

During operation of both the remote handset 102 and the base unit 190, the GPS position of the remote handset is periodically measured using the GPS system 520 located in the remote handset 102. The current GPS position of the remote handset 102 is compared to the base unit GPS position by the proximity determinator 310 to determine a distance, which is compared to a distance to attenuation table 313. Based on the GPS measured distance, appropriate attenuation is effected by the proximity determinator 310.

GPS has the advantage of providing information regarding the position of the handset with respect to the base, and therefore can accommodate various acoustical properties of the base unit and remote handset with respect to one another. For instance, the muting in accordance with the principles of the present invention can be performed at a greater distance when the handset is detected in front of the base unit than when the handset is behind the cordless telephone.

The present invention allows conference calling with use of both a handset and speakerphone base unit of a cordless telephone without risk of howling. The user of the remote handset does not have to go into one room with a handset when the speakerphone base unit is on in another room. Similarly, when the cordless telephone is in an intercom mode, the user of the handset will be able to walk to the base unit without risk of howling, which will be prevented even before it begins.

A proximity detection module in accordance with the principles of the present invention has many applications, e.g., in a cordless telephone chip set to add value and distinctiveness.

While the disclosed embodiments relate to a digital cordless telephone, the proximity muting and/or attenuation relates equally to analog cordless telephones, in accordance with the principles of the present invention.

While the invention has been described with reference to the exemplary embodiments thereof, those skilled in the art will be able to make various modifications to the described embodiments of the invention without departing from the true spirit and scope of the invention.

What is claimed is:

1. An audio path attenuation controller for a cordless telephone, comprising:
   a proximity determinator to repeatedly determine a distance based on a round trip delay between a handset of said cordless telephone and a base unit of said cordless telephone; and
   an attenuator to attenuate an audio path between said handset and said base unit based on said repeatedly determined distance.

2. The audio path attenuation controller for a cordless telephone according to claim 1, wherein:
   said cordless telephone has a speakerphone functionality; and
   said effected attenuation reducing instability in audible feedback between said handset and said base unit.

3. The audio path attenuation controller for a cordless telephone according to claim 1, wherein:
   said given attenuation is a fixed amount of attenuation based on said determined distance being less than or equal to a given threshold proximity distance between said handset and said base unit.

4. The audio path attenuation controller for a cordless telephone according to claim 1, wherein:
   said given attenuation is a variable amount of attenuation based on a relationship between a desired amount of attenuation and said determined distance.

5. The audio path attenuation controller for a cordless telephone according to claim 4, wherein:
   said desired amount of attenuation is determined from a look up table.

6. The audio path attenuation controller for a cordless telephone according to claim 1, wherein said proximity determinator further comprises:
   a receive signal strength indicator module.

7. An audio path attenuation controller for a cordless telephone, comprising:
   a proximity determinator including a global positioning satellite system to repeatedly determine a distance based on a round trip delay between a handset of said cordless telephone and a base unit of said cordless telephone; and
   an attenuator to attenuate an audio path between said handset and said base unit based on said repeatedly determined distance.

8. The audio path attenuation controller for a cordless telephone according to claim 7, wherein:
   said global positioning satellite system is installed in said handset.

9. The audio path attenuation controller for a cordless telephone according to claim 1, wherein:
   said proximity determinator determines said distance only when said handset and said base unit are operating simultaneously.

10. The audio path attenuation controller for a cordless telephone according to claim 9, wherein
   at least one of said handset and said base unit is operating in a speakerphone mode when said distance is determined.

11. The audio path attenuation controller for a cordless telephone according to claim 1, wherein:
   said attenuation is a muting of said audio path.

12. The audio path attenuation controller for a cordless telephone according to claim 1, wherein:
   said attenuation is variable in relationship to a distance between said handset and said base unit.

13. The audio path attenuation controller for a cordless telephone according to claim 1, wherein:
   said attenuation is a fixed amount of attenuation.

14. A method of attenuating an audio path of a cordless telephone, comprising:
   repeatedly determining a proximity of a handset of said cordless telephone to a base unit of said cordless telephone using a round trip delay timing of a signal between said handset and said base unit; and
   when said handset is within a predetermined distance to said base unit, attenuating at least one audio path between said handset and said base unit based on said repeatedly determined proximity.

15. The method of attenuating an audio path of a cordless telephone according to claim 14, further comprising:
   placing said cordless telephone in a speakerphone mode;
   said attenuation reducing instability in audible feedback between said handset and said base unit.

16. The method of attenuating an audio path of a cordless telephone according to claim 15, wherein:
   said at least one audio path is a path from a microphone of said handset.

17. The method of attenuating an audio path of a cordless telephone according to claim 14, further comprising:
   determining simultaneous operation of said handset and said base unit of said cordless telephone.

18. The method of attenuating an audio path of a cordless telephone according to claim 14, wherein:
   said proximity is determined using a receive signal strength indicator of a received signal.

19. A method of attenuating an audio path of a cordless telephone, comprising:
   repeatedly determining a proximity of a handset of said cordless telephone to a base unit of said cordless telephone using a difference between a GPS determined location of said handset and a GPS determined location of said base unit; and
   when said handset is within a predetermined distance to said base unit, attenuating at least one audio path between said handset and said base unit based on said repeatedly determined proximity.

20. Apparatus for attenuating an audio path of a cordless telephone, comprising:
   means for repeatedly determining a proximity of a handset of said cordless telephone to a base unit of said cordless telephone based on a round trip delay between said base unit and said handset; and
   means for attenuating at least one audio path between said handset and said base unit when said handset is within a predetermined distance to said base unit based on said repeatedly determined proximity;
   wherein said attenuation prevents instability in audible feedback between said handset and said base unit.

21. The apparatus for attenuating an audio path of a cordless telephone according to claim 20, wherein:
   said at least one audio path is a path from a microphone of said handset.

22. The apparatus for attenuating an audio path of a cordless telephone according to claim 20, further comprising:
   means for determining simultaneous operation of said handset and said base unit of said cordless telephone.

23. The apparatus for attenuating an audio path of a cordless telephone according to claim 20, wherein said means for determining comprises:
   a receive signal strength indicator module.

24. Apparatus for attenuating an audio path of a cordless telephone, comprising:
   means for repeatedly determining a proximity of a handset of said cordless telephone to a base unit of said cordless telephone based on a location provided by a global positioning satellite system;
   means for attenuating at least one audio path between said handset and said base unit when said handset is within a predetermined distance to said base unit based on said repeatedly determined proximity;
   wherein said attenuation prevents instability in audible feedback between said handset and said base unit.

* * * * *